J. W. JEPSON.
APPARATUS FOR STARTING INTERNAL COMBUSTION ENGINES.
APPLICATION FILED AUG. 25, 1919.
1,388,864.
Patented Aug. 30, 1921.
2 SHEETS—SHEET 2.
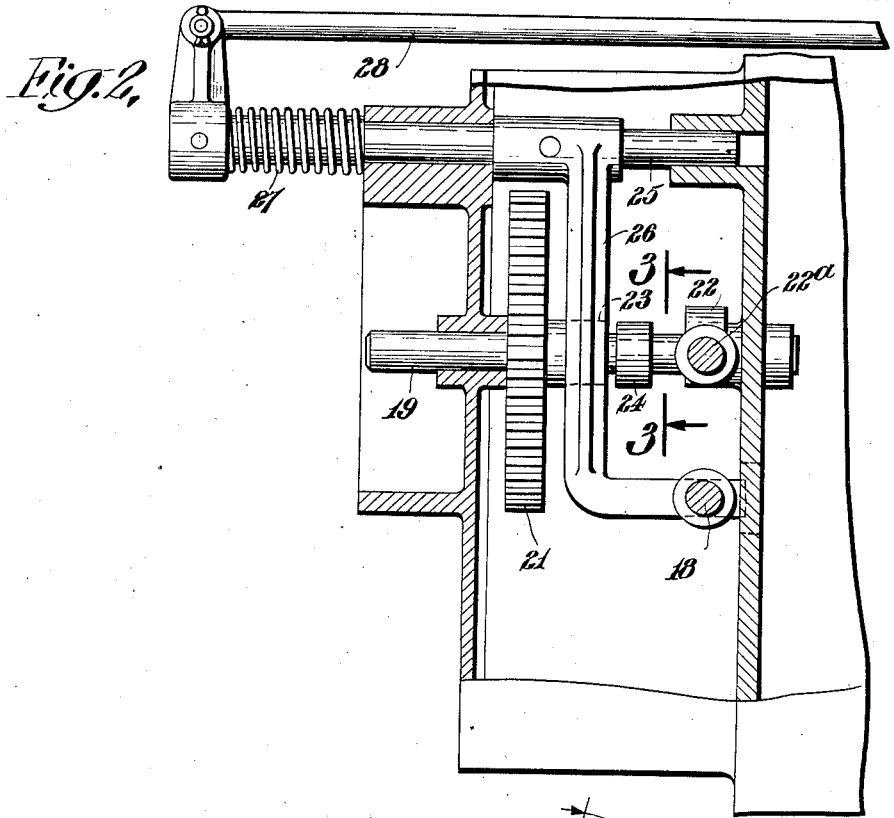
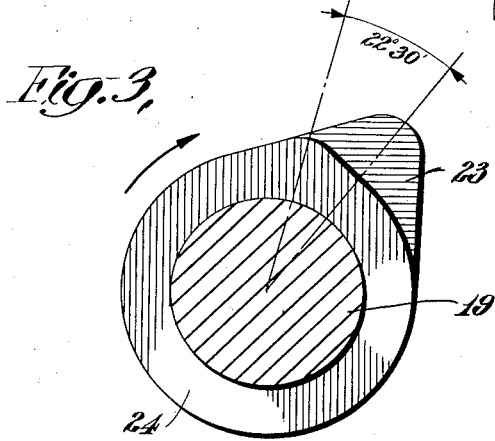

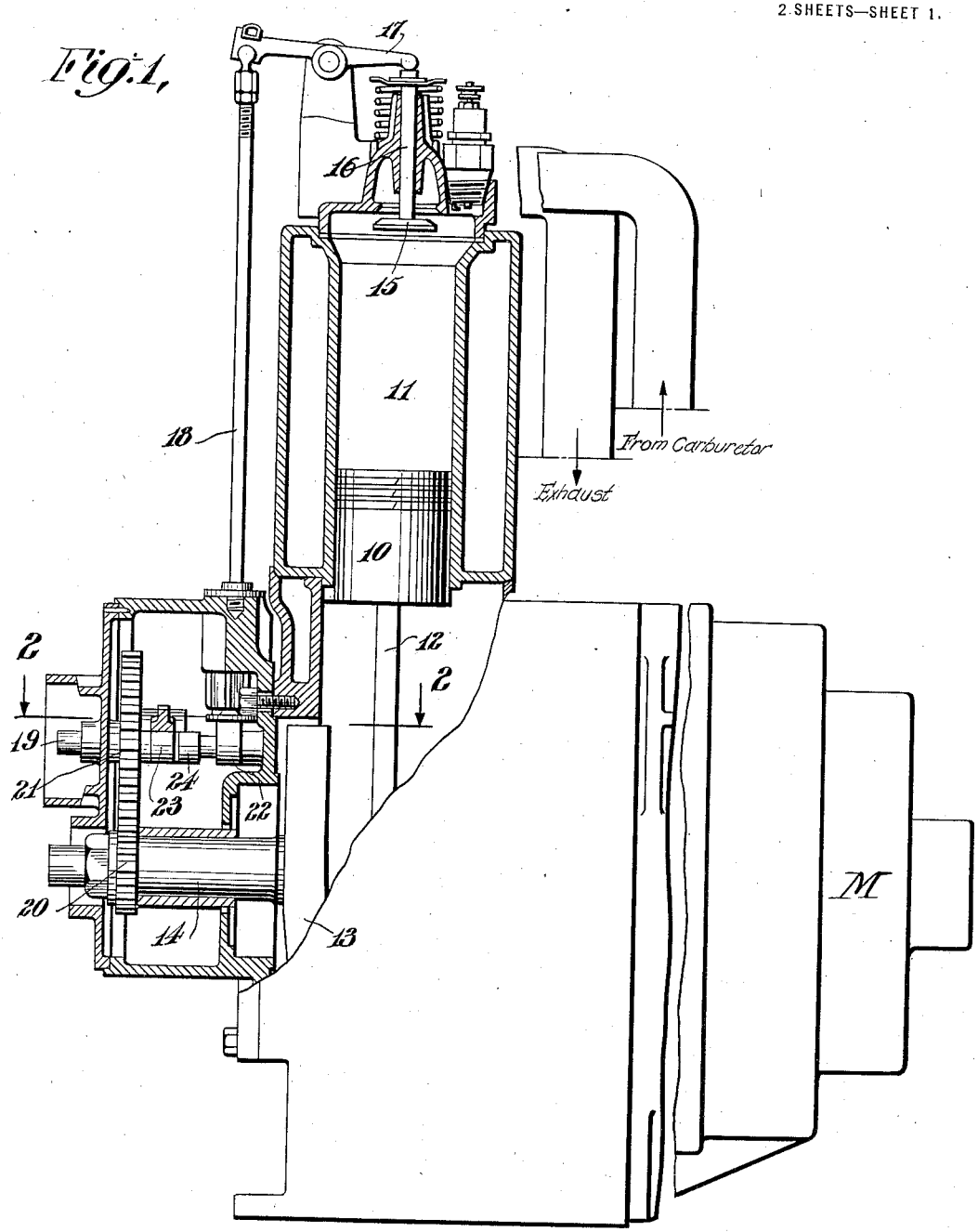

UNITED STATES PATENT OFFICE.

JOHN W. JEPSON, OF BUFFALO, NEW YORK, ASSIGNOR TO THE PREST-O-LITE COMPANY, INC., OF NEW YORK, N. Y., A CORPORATION OF NEW YORK.

APPARATUS FOR STARTING INTERNAL-COMBUSTION ENGINES.

1,388,864.  Specification of Letters Patent.  Patented Aug. 30, 1921.

Application filed August 25, 1919. Serial No. 319,622.

*To all whom it may concern:*

Be it known that I, JOHN W. JEPSON, a citizen of the United States, residing at Buffalo, in the county of Erie and State of New York, have invented certain new and useful Improvements in Apparatus for Starting Internal-Combustion Engines, of which the following is a full, clear, and exact description.

This invention relates to internal combustion engines of the type in which liquid fuel is picked up and vaporized in a suitable carbureter by a current of air flowing past an orifice from which the liquid hydrocarbon is delivered. To facilitate vaporization of the hydrocarbon, especially when kerosene or so-called low-grade gasolene is used it is common practice to heat the carbureter, as for example by means of the hot exhaust gases. This expedient serves very well after the engine has been started, but it is often difficult, if not impossible, to start the engine when the same is cold, without first warming the carbureter from an external source of heat. I have accordingly been led to devise my present invention, which has for its chief object to provide means by which the engine can be started easily and quickly when cold, even with so heavy a fuel as kerosene. For this purpose I provide means whereby the opening of the inlet valve, through which the charge is admitted to the cylinder, is delayed, so that the piston travels a certain distance down in the cylinder before the valve opens. This creates a relatively high vacuum in the cylinder, the exhaust valve being of course closed. Then when the intake valve opens the powerful suction draws the air at high velocity past the spray nozzle of the carbureter with the result that a sufficient quantity of the fuel is picked up by the air to form an explosive mixture; whereas if the intake valve is opened as or shortly after the piston passes the upper dead center the vacuum in the cylinder is relieved as fast as it is produced, with the result that the air passes through the carbureter at a velocity too low to vaporize the cold liquid.

In carrying out the invention in the preferred manner, I provide two intake cams for each intake valve, both on the same cam-shaft. One cam has the normal timing with respect to the crank-shaft and piston, and is for use when the engine is running. The other is delayed or set back. I also provide means whereby either cam may be used at will, so that the delayed cam may be brought into operation for starting the engine, particularly in cold weather.

The embodiment briefly outlined in the preceding paragraph is illustrated in the accompanying drawing. As there shown, it is applied to a single-cylinder four-cycle engine of the valve-in-head type, but it is to be understood that it is not limited in those respects.

Referring to the drawings:

Figure 1 shows the engine, somewhat diagrammatically, in vertical section through the cylinder on a plane parallel to the crank-shaft and cam-shaft.

Fig. 2 is a detail sectional plan view about on line 2—2 of Fig. 1.

Fig. 3 is a detail section on line 3—3 of Fig. 2.

The piston 10, reciprocating in the cylinder 11, is connected by connecting rod 12 to a crank or throw 13 on the crank shaft 14. The intake-valve 15 has a stem 16 coöperating with the rocker-arm 17 which is actuated by a push-rod 18 extending down to the vicinity of the cam shaft 19, rotated by the timing gears 20, 21. The exhaust valve (not shown) behind the intake valve, is actuated through similar mechanism by an exhaust cam 22 on the cam shaft, coöperating with push-rod 22ª, Fig. 2.

The two intake cams are shown at 23, 24. Parallel to the cam shaft is a sliding rod 25 on which is pinned an arm 26 extending above the intake cams and having its free end bent laterally to underly the intake push-rod 18, as clearly shown in Fig. 2. Normally, that is, when the engine is running, the arm 26 rests on the running intake-cam 23, as in Fig. 2. When the engine is at rest and is to be started the rod 25 is pushed in. This carries the arm off the running cam 23 and upon the starting cam 24, which, as will be seen in Fig. 3, is delayed or set back with respect to the other, with the result that the intake valve opens late, thus permitting the downwardly moving piston to create a powerful suction before the valve is opened. This causes the air to rush past the spray nozzle of the carbureter (not shown) and enables the air to pick up fuel. Moverover, at the time the valve opens, the piston, having moved well past the dead center, is traveling at a higher speed and hence maintains a stronger suction than when the valve is opened at or immediately after the dead center. It is sometimes advantageous to have the starting cam somewhat lower than the running cam, as indicated in Fig. 3, so that the valve will not be fully opened in starting the engine. This reduces the effective area of the intake port and hence aids in keeping up the velocity of the incoming charge. Since the intake push-rod is not operated directly by the cams but through the medium of a lever of the third class, both intake cams should, in general, be lower than the exhaust cam, so that in normal running both valves will have the same lift.

As soon as the engine is warmed up the rod 25 is released, whereupon the spring 27 retracts it to the normal running position, over the normal-running intake cam 23, as in Fig. 1.

The amount of delay given to the starting cam may vary, but in practice I have found that excellent results are obtained with the cam arranged about twenty-two and a half degrees behind the intake cam. In a four-cycle engine the cams rotate at half the speed of the crank-sraft; and since the intake cam is usually set to open the valve when the crank-shaft has turned about five degrees beyond the dead center, it will be seen that with the delay mentioned the valve opens when the crank-shaft is about fifty degrees from the dead center. At this point the piston has traversed about one-sixth of its total travel and is moving at a speed nearly a hundred times greater than at five degrees from the dead center. The net result is a rapid rush of air through the carbureter, which is maintained by the relatively high speed of the piston. In consequence, the fuel is readily picked up and the charges drawn into the cylinder contain sufficient hydrocarbon to be ignited by the spark.

The slide 25 is advanced by a rod 28, Fig. 2, which, in the case of an automobile engine, may be connected with the usual starting pedal so that the arm 26 will be shifted to the starting cam whenever the engine is cranked by a cranking means such as the electric motor M, which is provided for starting purposes.

If the carbureter is provided with electrical or other means for heating it before starting, the engine will of course start all the more quickly with my invention, but in general preliminary heating of the carbureter is not necessary.

The method of starting an internal combustion engine, herein disclosed, is claimed in my copending application, Ser. No. 319,621, filed Aug. 25, 1919.

It is to be understood that the invention is not limited to the construction herein specifically described but can be embodied in other forms without departure from its spirit.

I claim:

1. In an internal combustion engine, the combination with a piston, of an intake valve of a starting cam associated with the valve and adapted to permit the said valve to be kept closed until the piston has traveled a substantial distance on the intake stroke, said cam thereafter opening the said valve and permitting the entrance of mixture, means operable at will to bring said starting cam into operative relation with the valve, said means and said cam being so arranged as to be ineffective in changing the time of the point of closure of said valve.

2. In an internal combustion engine, the combination with a piston, of an intake valve, of a running intake cam to open the valve on the intake stroke of the piston, a starting intake cam to open the valve on the intake stroke of the piston after the piston has traveled a substantial distance beyond the point at which the valve is opened by the running cam, and means operable at will to bring either cam into operative association with the valve, for the purpose set forth.

3. In an internal combustion engine, the combination with a piston, of an intake valve, of a running intake cam to open the valve early and a starting intake cam to open the valve later in the intake stroke of the piston, and a member associated with the valve to actuate the same, said member being shiftable at will into coöperation with either cam for actuation thereby, for the purpose set forth.

4. In an internal combustion engine, the combination with a piston, of an intake valve, of a running intake cam to open the valve early, and a starting cam to open the valve later, in the intake stroke of the piston, a push-rod associated with the valve to actuate the same, and a member constantly engaging the push-rod and shiftable into coöperation with either cam at will for actuation thereby, for the purpose set forth.

5. In an internal combustion engine, the combination with a piston, of an intake valve, of a running intake cam to open the valve early, and a starting intake cam to open the valve later, in the intake stroke of the piston, a sliding member movable into coöperation with either cam at will for actuation thereby and associated with the valve to actuate the latter early or later in the intake stroke according to the cam by which said member is itself actuated, for the purpose set forth.

6. In an internal combustion engine, the combination with a piston, of an intake valve, of a cam-shaft, a running intake cam on the cam-shaft to open the valve early, and a starting intake cam to open the valve later, in the intake stroke of the piston, a push-rod connected at one end with the valve to actuate the same and having its other end adjacent to the cam-shaft, a sliding member parallel to the cam-shaft, and an arm carried by the sliding member to be shifted thereby to coöperate with either cam at will said arm being associated with the push-rod to actuate the same, for the purpose set forth.

7. In an internal combustion engine, the combination with a piston, of an intake valve, of means for opening the valve early or later in the intake stroke of the piston, means for cranking the engine to start the same, and a connection between the valve-opening means and the cranking means whereby the valve is opened late in the intake stroke whenever the cranking means is operated.

In testimony whereof I hereunto affix my signature.

JOHN W. JEPSON.